(12) United States Patent
Kitano et al.

(10) Patent No.: US 12,376,611 B2
(45) Date of Patent: *Aug. 5, 2025

(54) METHOD FOR PRODUCING INSTANT FRIED NOODLES

(71) Applicant: NISSIN FOODS HOLDINGS CO., LTD., Osaka (JP)

(72) Inventors: Sho Kitano, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/482,604

(22) PCT Filed: Feb. 15, 2017

(86) PCT No.: PCT/JP2017/005418
§ 371 (c)(1),
(2) Date: Jul. 31, 2019

(87) PCT Pub. No.: WO2018/150479
PCT Pub. Date: Aug. 23, 2018

(65) Prior Publication Data
US 2020/0245656 A1 Aug. 6, 2020

(51) Int. Cl.
*A23L 7/113* (2016.01)
*A23L 5/10* (2016.01)
*A23P 30/20* (2016.01)

(52) U.S. Cl.
CPC ............. *A23L 7/113* (2016.08); *A23L 5/11* (2016.08); *A23P 30/20* (2016.08); *A23V 2002/00* (2013.01)

(58) Field of Classification Search
CPC .......... A23L 7/109; A23L 7/111; A23L 7/113; A23L 4/11; A23L 4/12; A23L 7/11; A23P 30/20; A21C 1/006; A21C 3/02; A21C 3/024; A21C 3/04; A21C 11/22; A21C 3/10; A21C 9/00; A21C 9/02; A21C 11/00; A21C 11/10; A21C 11/103; A21C 11/16; A21C 11/24; A21C 15/00; A21C 3/021; A21C 3/025; A21C 3/027; A21C 11/08; A23V 2300/16; A23V 2002/00; B29K 2105/007; B29C 43/44; B29C 43/46; B29C 44/30; B29C 44/306; B29C 48/001; B29C 48/0011; B29C 48/35; B29C 55/18; B30B 3/00; B30B 49/38; A23C 3/02; A23C 3/021; A23C 3/024; A23C 3/025; A23C 3/027; A23C 3/04; A23C 3/10; A23C 11/004; A23C 11/006; A23C 11/008

See application file for complete search history.

(56) References Cited

U.S. PATENT DOCUMENTS

| | | | |
|---|---|---|---|
| 2,873,697 A * | 2/1959 | Strahmann | A21D 8/04 426/503 |
| 4,098,906 A | 7/1978 | Hisaki et al. | |
| 4,230,735 A | 10/1980 | Yoshida et al. | |
| 4,675,199 A | 6/1987 | Hsu | |
| 4,728,520 A | 3/1988 | Kubo et al. | |
| 4,925,696 A * | 5/1990 | Slimak | A61Q 19/00 426/523 |
| 5,120,556 A | 6/1992 | Fujimoto et al. | |
| 5,500,236 A | 3/1996 | Miller et al. | |
| 5,916,616 A * | 6/1999 | Kuwada | A23L 19/13 426/451 |
| 5,916,619 A * | 6/1999 | Miyazaki | C12Y 302/01001 426/18 |
| 6,042,866 A * | 3/2000 | Greene | A23L 7/111 426/503 |
| 6,596,331 B1 * | 7/2003 | Nobuyasu | A23L 7/111 426/325 |

(Continued)

FOREIGN PATENT DOCUMENTS

| | | |
|---|---|---|
| CN | 1907100 | 2/2007 |
| CN | 104738423 | 7/2015 |

(Continued)

OTHER PUBLICATIONS

JP 2000245377 A1 USPTO translation, originally published Sep. 12, 2009 (Year: 2009).*
JP2000245377A translation, originally published Sep. 12, 2009 (Year: 2009).*
USPTO partial translation of JP2000245377A, original document published Sep. 12, 2009 (Year: 2009).*
The extended European Search Report issued for European Patent Application No. 17896468.0, Jul. 23, 2020, 14 pages.
L. Popper et al., "23.2 Asian Wheat Noodles", The future of flour, Jan. 1, 2006, pp. 1-24, XP055499570, Retrieved from the Internet:URL:https://muehlenchemie.de/downloads-future-of-flour/FoF_Kap_23-2.pdf.

(Continued)

*Primary Examiner* — Erik Kashnikow
*Assistant Examiner* — Bryan Kim
(74) *Attorney, Agent, or Firm* — HSML P.C.

(57) ABSTRACT

[Problem to be Solved] An object of the present invention is to provide a method for producing instant fried noodles having a lower fat or oil content than usual fried noodles. [Solution] Instant fried noodles having a remarkably lower fat or oil content than usual fried noodles and having good texture can be produced by forming dough, which has been prepared by kneading a raw material powder with kneading water added thereto by an ordinary method, into a noodle belt by extrusion using an extruding machine, performing strong rolling for reducing a thickness of the noodle belt after passing through a rolling roll to less than 10% of the thickness of the noodle belt before passing though the rolling roll, with the noodle belt rolled out to a desired thickness by performing rolling three times or less, cutting the resultant noodle belt with a cutting blade roll to obtain raw noodle strings, and thereafter steaming and drying by frying the noodle strings.

6 Claims, No Drawings

(56) References Cited

U.S. PATENT DOCUMENTS

| | | | |
|---|---|---|---|
| 8,597,707 B2* | 12/2013 | Ishii | A23L 7/113 426/557 |
| 2005/0266136 A1 | 12/2005 | Kurachi | |
| 2010/0323070 A1 | 12/2010 | Seto et al. | |
| 2011/0129582 A1* | 6/2011 | Miyazaki | A23L 7/113 426/451 |
| 2011/0229613 A1 | 9/2011 | Takizawa et al. | |
| 2012/0003376 A1 | 1/2012 | Alam | |
| 2012/0207897 A1 | 8/2012 | Ishii et al. | |
| 2012/0288607 A1 | 11/2012 | Takahashi | |
| 2013/0059046 A1 | 3/2013 | Yamaya et al. | |
| 2013/0122173 A1 | 5/2013 | Nagayama | |
| 2013/0202765 A1* | 8/2013 | Nagayama | A21C 11/24 83/503 |
| 2013/0287921 A1 | 10/2013 | Nagayama | |
| 2015/0086696 A1* | 3/2015 | Maeda | A23L 7/109 426/523 |
| 2016/0249652 A1 | 9/2016 | Tanaka et al. | |
| 2017/0280753 A1 | 10/2017 | Kitano et al. | |
| 2018/0206507 A1 | 7/2018 | Ng | |

FOREIGN PATENT DOCUMENTS

| | | |
|---|---|---|
| EP | 0754410 | 1/1997 |
| EP | 3053455 | 8/2016 |
| EP | 3357349 | 8/2018 |
| EP | 3420826 | 1/2019 |
| EP | 3427596 | 1/2019 |
| GB | 2170091 | 7/1986 |
| JP | 55-064773 | 5/1980 |
| JP | 56-28135 | 6/1981 |
| JP | 59-025655 | 2/1984 |
| JP | 61-15661 | 1/1986 |
| JP | S1-74554 | 4/1986 |
| JP | 61-280242 | 12/1986 |
| JP | 63-52868 | 10/1988 |
| JP | 1-320961 | 12/1989 |
| JP | 2-097361 | 4/1990 |
| JP | 3-066792 | 3/1991 |
| JP | 6-237719 | 8/1994 |
| JP | 9-294553 | 11/1997 |
| JP | 10-155445 | 6/1998 |
| JP | 11-266813 | 10/1999 |
| JP | 2000-093106 | 4/2000 |
| JP | 2000-245377 | 9/2000 |
| JP | 3195740 B | 8/2001 |
| JP | 2002-238454 | 8/2002 |
| JP | 2004-344081 | 12/2004 |
| JP | 2006-122020 | 5/2006 |
| JP | 2006-288239 | 10/2006 |
| JP | 2007-222139 | 9/2007 |
| JP | 2007-330173 | 12/2007 |
| JP | 2011-55789 | 3/2011 |
| JP | 4772160 B | 9/2011 |
| JP | 5039716 | 10/2012 |
| JP | 2014-012016 | 1/2014 |
| JP | 5421784 | 2/2014 |
| JP | 2015-065963 | 4/2015 |
| WO | 2010/055860 | 5/2010 |
| WO | 2011/114690 | 9/2011 |
| WO | 2015/050121 | 4/2015 |
| WO | 2017/043187 | 3/2017 |

OTHER PUBLICATIONS

International Search Report issued in International Application No. PCT/JP2017/005418, Mar. 28, 2017, 5 pages.
Written Opinion issued in International Application No. PCT/JP2017/005418, Mar. 28, 2017, 4 pages.
Office Action issued for Chinese Patent Application No. 201780012103.1, Feb. 3, 2019, 10 pages including English translation.
Office Action issued for Brazilian Patent Application No. BR112018068109-1, Nov. 3, 2021, 8 pages including English translation.
The extended European Search Report issued for European Patent Application No. 17762996.1, dated Oct. 22, 2019, 10 pages.
Guoquan Hou et al., "Asian Noodle Technology", Asian Noodle—Technical Bulletin, vol. XX, No. 12, pp. 1-10, Dec. 1, 1998, URL:https://secure.aibonline.org/catalog/example/V20Iss12.pdf.
International Search Report and Written Opinion of the ISA (Forms PCT/ISA/210 and PCT/ISA/237) issued in International Application No. PCT/JP2017/007646, May 30, 2017, 9 pages with an English translation of the ISR.
Decision to Grant issued in corresponding Japanese Patent Application Serial No. 2016-043210, May 15, 2018, 4 pages.
China Office action, dated Nov. 5, 2014 along with an English machine translation thereof.
European Search Report in related European Patent Application No. 11861520.2 dated Nov. 26, 2013.

* cited by examiner

METHOD FOR PRODUCING INSTANT FRIED NOODLES

TECHNICAL FIELD

The present invention relates to a method for producing instant fried noodles.

BACKGROUND ART

Conventional methods for producing instant noodles can be roughly divided into that for fried noodles and that for non-fried noodles. The fried noodles are noodles produced by drying gelatinized noodles by performing a frying process in an oil at a temperature about 150° C. On the other hand, the non-fried noodles are noodles produced by drying gelatinized noodles by a drying method excluding frying in an oil, and there are several methods for producing the non-fried noodles, among which a hot-air drying method in which noodles are exposed to hot air at an air velocity of about 4 m/s or less and at about 60 to 100° C. for about 30 to 90 minutes for drying is generally employed.

The fried noodles have high reconstitutability because moisture within the noodles evaporate during the frying process to form a porous structure and are characterized by snack-like flavor derived from an oil peculiar to the fried noodles, and a variety of instant noodles such as noodles in plastic bags or cups are now commercially available. The fried noodles contain, however, a large amount of oils, and hence have a higher calorie content than the non-fried noodles. Therefore, attempts have been made for developing fried noodles having a reduced fat or oil content while having the characteristic of the fried noodles (for example, Patent Literatures 1 and 2).

Patent Literature 1 describes, as a technique for making non-fried noodles more similar to fried noodles, a method for producing instant non-fried noodles in which an oil is sprayed onto noodle strings into which a fat or oil has been kneaded, the resultant noodle strings are steamed, put in a retainer, and then puffed and dried with high-temperature and high-velocity hot air.

Besides, Patent Literature 2 describes the following technique as a method for producing fried noodles having a reduced fat or oil content and free from browning caused by kansui: Dough with pH 7.5 to 8.5 is prepared by mixing 0.3 to 0.6% by weight of sodium carbonate and/or potassium carbonate and an acidic substance with a noodle material powder, raw noodle strings are obtained by extruding or rolling out the dough and cutting the resultant, and then, the obtained raw noodle strings are steamed, flavored and dried by frying. This method is an excellent method for reducing a fat or oil content of fried noodles, but it is necessary to use large amounts of kansui and the acidic substance for pH adjustment.

CITATION LIST

Patent Literature

[Patent Literature 1] Japanese Patent No. 5421784
[Patent Literature 2] Japanese Patent No. 5039716

SUMMARY OF INVENTION

Technical Problem

An object of the present invention is to provide a method for producing instant fried noodles having a lower fat or oil content than usual fried noodles.

Solution to Problem

As a method for preparing raw noodle strings in production of noodles by machines, in general, dough is obtained by mixing and kneading a raw material powder with kneading water added thereto, the dough is formed into crude noodle belts using a shaping roll, the crude noodle belts are compounded to prepare a noodle belt, the noodle belt is rolled out to a desired thickness by performing rolling plural times using a rolling roll(s) (hereinafter "a rolling roll" referred to as a rolling roll(s) unless otherwise specified), and the resultant noodle belt is cut with a cutting blade roll to obtain raw noodle strings. Here, it is said that the rolling using a rolling roll is preferably performed to gradually reduce the thickness so as not to damage gluten tissue otherwise damaged by applying excessive force to the dough, and it is said that the number of rolls needs to be increased for increasing efficiency (see "Shintei Men no Hon (Book of Noodles, newly revised)" revised in 2003, pp. 62-65, published by Shokuhin Sangyo Shinbunsha Co., Ltd.).

The inventors have found out that linkage of gluten and formation of gluten tissue by extension in a rolling direction caused in the preparation of a noodle belt or the rolling accelerate formation of fine pores in the noodle strings in the frying process, and that this is the cause of a high fat or oil content. Therefore, the inventors earnestly studied a method for reducing a fat or oil content by inhibiting the formation of gluten tissue in the preparation of a noodle belt or the rolling, resulting in finding that instant fried noodles having good texture and having a remarkably reduced fat or oil content can be produced by preparing a noodle belt through extrusion with an extruding machine performed particularly under reduced pressure, by reducing the number of times of performing rolling, and by performing rolling for excessive compression in a rolling step, and thus, the present invention was accomplished.

Specifically, the present invention provides: a method for producing instant fried noodles, including: a dough preparing step of preparing dough by an ordinary method by kneading a main raw material powder with kneading water added thereto; a noodle belt preparing step of preparing a noodle belt by extruding the dough having been prepared in the dough preparing step using an extruding machine; a rolling step of rolling out the noodle belt having been prepared in the noodle belt preparing step to a desired thickness by performing rolling using a rolling roll three times or less; a cutting step of cutting, with a cutting blade roll, the noodle belt having been rolled out to the desired thickness in the rolling step to obtain raw noodle strings; a gelatinizing step of gelatinizing the raw noodle strings having been cut in the cutting step; and a fry drying step of drying, by frying, the noodle strings having been gelatinized in the gelatinizing step, in which the rolling is performed in the rolling step in such a manner that a thickness of the noodle belt after passing through the rolling roll is less than 10% of a thickness of the noodle belt before passing through the rolling roll.

Besides, the number of times of performing the rolling in the present invention is preferably twice or less, and further preferably once.

Besides, the rolling performed in such a manner that the thickness of the noodle belt after passing through the rolling roll is less than 10% of the thickness of the noodle belt before passing through the rolling roll is preferably performed in first rolling in the rolling step.

Besides, as a condition for preparing the noodle belt using the extruding machine in the present invention, the extrusion is performed preferably under reduced pressure of a degree of vacuum of −200 mmHg or less.

Furthermore, strong rolling of the present invention is performed preferably in such a manner that the thickness of the noodle belt obtained after passing through the rolling roll is 3 to 8% of the thickness of the noodle belt before passing through the rolling roll.

Advantageous Effects of Invention

According to the present invention, a method for producing instant fried noodles having a lower fat or oil content than usual fried noodles can be provided.

DESCRIPTION OF EMBODIMENTS

Now, the present invention will be described in detail. It is noted that the present invention is not limited to the following description.

It is noted that the type of instant fried noodles produced in the present invention is not particularly limited, and in general, may be any of those known in this technical field. Examples include udon (Japanese wheat noodles), soba (buckwheat noodles), Chinese noodles and pastas.

1. Raw Material Formulation

In the instant fried noodles of the present invention, general materials of instant noodles can be used. Specifically, as a main raw material powder, a single one of or a mixture of flours such as a wheat flour, a buckwheat flour and a rice flour, and various starches such as a potato starch, a tapioca starch and a corn starch may be used. As the starch, raw starch, gelatinized starch, and processed starches such as acetylated starch, etherified starch and crosslinked starch can be also used. Besides, in the present invention, any of a salt, an alkaline agent, various thickeners, a noodle quality modifier, edible fats or oils, various pigments such as a carotene pigment, and preservatives that are generally used in production of instant noodles can be added to the main raw material powder. Such an additional component may be added in the form of a powder together with the main raw material powder, or may be dissolved or suspended in kneading water for the addition.

2. Dough Preparing Step

A method for preparing dough of the present invention may be performed by an ordinary method. Specifically, a batch mixer, a flow jet mixer, a vacuum mixer or the like may be used for homogeneously mixing/kneading the noodle material powder and kneading water, so as to prepare crumbly dough. Here, if the amount of water added as the kneading water is too much, the dough is formed into the shape of small balls, which not only makes subsequent steps of preparing a noodle belt and rolling difficult to perform but also causes excessive bubbling due to the excessive moisture in a frying process to accelerate replacement of the moisture with a fat or oil, and hence the fat or oil content is difficult to reduce. The amount of water added in the form of the kneading water depends on the temperature of the dough, and the kneading water is preferably added so that moisture in the resultant dough can be preferably 25 to 45% by weight, more preferably 32 to 36% by weight, and particularly preferably 33 to 35% by weight.

3. Preparation Step of Noodle Belt

The thus prepared dough is used to prepare a noodle belt. In the present invention, a noodle belt is prepared by extrusion using an extruding machine such as an extruder. At this point, the noodle belt can be prepared also under reduced pressure. If the condition of reduced pressure is too weak, dense texture is weakened and the effect of reducing a fat or oil content is reduced, and therefore, a degree of vacuum of −200 mmHg or less is preferred. On the contrary, if the condition of reduced pressure is too excessive, the extruded noodle belt becomes so excessively dense that moisture cannot be satisfactorily evaporated from resultant noodle strings in a fry drying step described later, and a large number of convex ridges including bubbles therein, which are called blisters, are formed on the surfaces of the noodle strings and affect the texture, and therefore, the degree of vacuum is preferably −700 mmHg or more. The preparation is performed under reduced pressure of a degree of vacuum of more preferably −600 mmHg to −200 mmHg, and further preferably −600 mmHg to −400 mmHg.

4. Rolling Step

Subsequently, the noodle belt having been prepared in the noodle belt preparing step is rolled out to a desired thickness by performing rolling using a rolling roll. In the present invention, the number of times of performing the rolling is three times or less. If the number of times of performing the rolling exceeds this number, linkage and extension in a rolling direction of gluten caused in the rolling proceed, and hence formation of gluten tissue proceeds, which forms fine pores in instant fried noodles dried by frying in the fry drying step described later, resulting in abruptly increasing a fat or oil content. Besides, as the number of times of performing the rolling is increased, the surface becomes dense and smooth, moisture is difficult to evaporate from the surface of the noodles in the fry drying described later, and hence a blister is easily caused. The noodle belt is rolled out to a desired thickness by performing the rolling preferably twice or less, and particularly preferably once. Incidentally, the rolling performed in the present invention substantially refers to an operation for reducing the thickness as a whole. Accordingly, if a noodle belt is caused to pass through a rolling roll, which is not to be used because the number of times of performing the rolling is reduced, merely for fine adjustment without reducing the thickness, such an operation is not defined as the rolling in the present invention.

Besides, in the present invention, such strong rolling that the thickness of the noodle belt after passing through the rolling roll is less than 10% of the thickness of the noodle belt before passing through the rolling roll is performed. When such strong rolling is performed, the gluten tissue is broken, and therefore, a structure of instant fried noodles dried by frying in the fry drying step described later is inhibited from puffing and having fine pores as compared with that of usual fried noodles, resulting in remarkably reducing the fat or oil content as compared with that of the usual fried noodles. Besides, when the noodle belt is compressed at a time, a dense and smooth surface resulting from the extrusion performed under reduced pressure is roughened, and hence the moisture is smoothly evaporated in the fry drying described later, which makes it difficult to cause a blister. Furthermore, when the rolling is performed a plurality of times, the strong rolling is preferably performed in the first rolling. In addition, as for a preferable rolling degree employed as a condition of the strong rolling, since a fat or oil content is reduced as a compression degree is higher, the rolling is preferably performed so that the thickness of the noodle belt after passing through the rolling roll can be 3 to 8% of the thickness of the noodle belt before passing through the rolling roll. Incidentally, in the present invention, a ratio (%) of the thickness of a noodle belt after passing through a rolling roll to the thickness of the noodle belt before passing through the rolling roll is sometimes expressed as a compression ratio. Since the strong rolling of the present invention causes strong compression, load is applied to the used rolling roll. Therefore, it is preferable to prevent excessive load from being applied to the rolling roll by using, as the rolling roll, a roll having a larger diameter than a usual one, or by performing the rolling slowly.

5. Cutting Step

Next, the noodle belt having been rolled out to a desired thickness in the rolling step is cut using a roll having a plurality of circular blades designated as a cutting blade roll to obtain raw noodle strings.

6. Gelatinizing Step

Subsequently, the thus obtained raw noodle strings are gelatinized by steaming with steam and/or boiling by an ordinary method. As a steaming method with steam, heating can be performed not only with saturated water vapor but also with superheated water vapor.

7. Flavoring Step

In the present invention, the thus gelatinized noodle strings may be flavored by application of a seasoning liquid (a liquid seasoning) to the noodle strings by spraying, dipping or the like. The flavoring step is not always necessary and may be omitted. Alternatively, without seasoning, water alone may be applied, or an aqueous solution containing a loosening agent dissolved therein may be applied.

8. Cut and Input

Subsequently, the noodle strings are cut into a length of 20 to 50 cm corresponding to a single meal amount. The cut noodle strings are input to a metal fry drying device including a lid and a container, called a fry retainer.

9. Fry Drying Step

The fry retainer containing the noodles therein is moved in a metal tank, designated as a fryer, holding a cooking oil heated to about 130 to 160° C., so as to dip the noodles in the oil, and thus, moisture in the noodles is evaporated and the noodles are dried. Examples of the cooking oil used here include palm oil and lard. The noodles are dried so as to have a moisture of 1 to 8% by weight after the fry drying step.

10. Cooling Step

After the fry drying step, the lid is removed and a noodle lump is taken out of the container. The noodle lump thus taken out is cooled for a prescribed period of time to obtain instant fried noodles.

11. Other Steps

The cooled instant fried noodles are transferred to a packaging step to be packed in a cup or a bag together with soup and ingredients, and the resultant is sold as a product of the instant fried noodles.

In this manner, instant fried noodles having a remarkably lower fat or oil content than usual fried noodles and having good texture can be produced by: forming dough, which has been prepared by kneading a raw material powder with kneading water added thereto by an ordinary method, into a noodle belt by extrusion using an extruding machine; performing strong rolling for reducing the thickness of the noodle belt after passing through a rolling roll to less than 10% of the thickness of the noodle belt before passing though the rolling roll, with the noodle belt rolled out to a desired thickness by performing rolling three times or less; cutting the resultant noodle belt with a cutting blade roll to obtain raw noodle strings; and thereafter steaming and drying by frying the noodle strings.

EXAMPLES

The present embodiment will be described in more detail with reference to examples.

Experiment 1

<Number of Times of Performing Rolling and Compression Degree>

Example 1-1

Powders of 900 g of wheat flour and 100 g of starch were mixed, and to the resultant, 340 ml of kneading water containing 15 g of salt, 2.3 g of kansui and 0.4 g of polyphosphate salt dissolved therein was added, and the resultant mixture was mixed/kneaded with a normal pressure high speed mixer for 3 minutes to prepare crumbly dough. At this point, the dough had a moisture of 35.8%.

The thus prepared dough was extruded using an extruding machine under reduced pressure of a degree of vacuum of −400 mmHg to prepare a noodle belt having a thickness of 12 mm.

The thus prepared noodle belt was rolled out once using a rolling roll to a desired thickness of 0.75 mm (compression ratio: 6.3%). A peripheral speed of the roll was set to 0.85 m/s in consideration of load applied to the roll. The noodle belt thus rolled out was formed into noodle strings using a cutting blade roll of a #20 square blade.

The noodle strings thus cut were immediately steamed for 2 minutes in a steam chamber into which saturated water vapor was supplied at 240 kg/h.

The steamed noodle strings were dipped for 5 seconds in a liquid seasoning containing, per 1 L, 90 g of salt, 13.5 g of glutamic acid, 10 ml of soy sauce and 30 g of a meat extract dissolved therein, and thereafter, the resultant noodle strings were drawn and cut into a length of 30 cm.

The cut noodle strings thus flavored were input to a cup-shaped metal container, which had an upper surface diameter of 87 mm, an underside diameter of 72.5 mm and a height of 60 mm, and had a large number of small holes of a diameter of 2.9 mm on the underside, in an amount corresponding to a weight of 100 g, the container was then covered with a metal lid also having a large number of small holes of a diameter of 2.9 mm, and the resultant was dipped in a fryer heated to 150° C. for drying by frying.

The fried noodles thus dried by frying were crushed for uniforming, and its fat or oil content was analyzed by the Soxhlet extraction method.

Example 1-2

A sample of fried noodles was produced in the same manner as in Example 1-1 except that the noodle belt prepared using the extruding machine had a thickness of 25 mm (compression ratio: 3%).

Example 1-3

A sample of fried noodles was produced in the same manner as in Example 1-1 except that the noodle belt prepared using the extruding machine had a thickness of 8 mm (compression ratio: 9.4%).

Example 1-4

A sample of fried noodles was produced in the same manner as in Example 1-1 except that the rolling was performed twice, that a noodle belt with a thickness of 12 mm was rolled out to 0.9 mm (compression ratio: 7.5%) at a roll peripheral speed of 0.85 m/s in the first rolling, and that the noodle belt was then rolled out to 0.75 mm at a roll peripheral speed of 18 m/s in the second rolling.

Example 1-5

A sample of fried noodles was produced in the same manner as in Example 1-1 except that the rolling was performed twice, that a noodle belt with a thickness of 12 mm was rolled out to 1.1 mm (compression ratio: 9.2%) at a roll peripheral speed of 0.85 m/s in the first rolling, and that the noodle belt was then rolled out to 0.75 mm at a roll peripheral speed of 18 m/s in the second rolling.

Example 1-6

A sample of fried noodles was produced in the same manner as in Example 1-1 except that the rolling was performed twice, that a noodle belt with a thickness of 12 mm was rolled out to 11 mm (compression ratio in first rolling: 91%) at a roll peripheral speed of 18 m/s in the first rolling, and that the noodle belt was then rolled out to 0.75 mm (compression ratio in second rolling: 6.8%) at a roll peripheral speed of 0.85 m/s in the second rolling.

Example 1-7

A sample of fried noodles was produced in the same manner as in Example 1-1 except that the rolling was performed three times, that a noodle belt with a thickness of 12 mm was rolled out to 1.1 mm (compression ratio: 9.2%) at a roll peripheral speed of 0.85 m/s in the first rolling, that the roll peripheral speed was set to 18 m/s in the second and later rolling, and that the noodle belt was rolled out to 0.9 mm in the second rolling and then to 0.75 mm in the third rolling.

Comparative Example 1-1

Powders of 900 g of wheat flour and 100 g of starch were mixed, and to the resultant, 340 ml of kneading water containing 15 g of salt, 2.3 g of kansui and 0.4 g of polyphosphate salt dissolved therein was added, and the resultant mixture was mixed/kneaded with a normal pressure mixer for 15 minutes to prepare crumbly dough. At this point, the dough had a moisture of 35.0%.

The thus prepared dough was formed into a crude noodle belt using a usual shaping roll under normal pressure, and two crude noodle belts were compounded using the shaping roll again to prepare a noodle belt. At this point, the noodle belt had a thickness of 12 mm.

The thus prepared noodle belt was rolled out using a rolling roll. The number of times of performing the rolling was six times with a roll peripheral speed always set to 18 m/s, so that a noodle belt with a thickness of 12 mm could be rolled out to 7 mm in the first rolling, to 4 mm in the second rolling, to 2.5 mm in the third rolling, to 1.3 mm in the fourth rolling, to 0.9 mm in the fifth rolling, and to 0.75 mm in the sixth rolling.

Thereafter, the same production method as that of Example 1-1 was performed to prepare a sample of fried noodles.

Comparative Example 1-2

A sample of fried noodles was produced in the same manner as in Example 1-1 except that the number of times of performing the rolling was six times with a roll peripheral speed always set to 18 m/s, so that a noodle belt with a thickness of 12 mm could be rolled out to 7 mm in the first rolling, to 4 mm in the second rolling, to 2.5 mm in the third rolling, to 1.3 mm in the fourth rolling, to 0.9 mm in the fifth rolling, and to 0.75 mm in the sixth rolling.

Comparative Example 1-3

A sample of fried noodles was produced in the same manner as in Example 1-1 except that a degree of vacuum employed in the preparation of a noodle belt was set to −700 mmHg, and that the number of times of performing the rolling was six times with a roll peripheral speed always set to 18 m/s, so that a noodle belt with a thickness of 12 mm could be rolled out to 7 mm in the first rolling, to 4 mm in the second rolling, to 2.5 mm in the third rolling, to 1.3 mm in the fourth rolling, to 0.9 mm in the fifth rolling, and to 0.75 mm in the sixth rolling.

Comparative Example 1-4

A sample of fried noodles was produced in the same manner as in Example 1-1 except that the number of times of performing the rolling was changed to twice, so that a noodle belt with a thickness of 12 mm could be rolled out to a thickness of 3 mm (compression ratio: 25%) at a roll peripheral speed of 0.85 m/s in the first rolling and then to a thickness of 0.75 mm at a roll peripheral speed of 18 m/s in the second rolling.

Comparative Example 1-5

A sample of fried noodles was produced in the same manner as in Example 1-1 except that the number of times of performing the rolling was twice, so that a noodle belt with a thickness of 12 mm could be rolled out to 6 mm (compression ratio: 50%) at a roll peripheral speed of 18 m/s in the first rolling, and to 0.75 mm at a roll peripheral speed of 18 m/s in the second rolling.

Comparative Example 1-6

A sample of fried noodles was produced in the same manner as in Example 1-1 except that the number of times of performing the rolling was changed to three times, so that a noodle belt with a thickness of 12 mm could be rolled out to a thickness of 3.0 mm (compression ratio: 25%) at a roll peripheral speed of 0.85 m/s in the first rolling, to a thickness of 0.9 mm in the second rolling and to a thickness of 0.75 mm in the third rolling with a roll peripheral speed set to 18 m/s in the second and later rolling.

Comparative Example 1-7

A sample of fried noodles was produced in the same manner as in Example 1-1 except that the number of times of performing the rolling was four times, so that a noodle belt with a thickness of 12 mm could be rolled out to 1.1 mm (compression ratio: 9.2%) at a roll peripheral speed of 0.85 m/s in the first rolling, and then, with the roll peripheral speed set to 18 m/s in the second and later rolling, to 1.0 mm in the second rolling, to 0.9 mm in the third rolling, and to 0.75 mm in the fourth rolling.

The effect of reducing a fat or oil content and the occurrence degree of blisters of the samples of the fried noodles prepared in Experiment 1 were evaluated.

The effect of reducing a fat or oil content was evaluated on the assumption that the sample of Comparative Example 1-1 was a usual product, one having a fat or oil content reduced, as compared with that of Comparative Example 1-1, by 4.5% by weight or more was rated as 5, one reduced by 3% by weight or more and less than 4.5% by weight was rated as 4, one reduced by 1.5% by weight or more and less than 3% by weight was rated as 3, one reduced by 0% by weight or more and less than 1.5% by weight was rated as 2, and one having a fat or oil content increased as compared with that of Comparative Example 1-1 was rated as 1.

Besides, with respect to the occurrence degree of blisters, on the assumption that the sample of Comparative Example 1-1 was a usual product, one having equivalent or fewer blisters as compared with Comparative Example 1-1 was rated as 5, one having a satisfactorily small number of blisters as compared with Comparative Example 1-1 was rated as 4, one having some blisters as compared with Comparative Example 1-1 but basically allowable as a product was rated as 3, one having a noticeable number of blisters as compared with Comparative Example 1-1 and not allowable as a product was rated as 2, and a sample having a remarkably large number of blisters was rated as 1.

Furthermore, with respect to comprehensive evaluation, one evaluated in the occurrence of blisters as basically allowable as a product (rated as 3) or better was assigned, as a comprehensive evaluation rating, an average of the rating of the effect of reducing a fat or oil content and the rating of the occurrence degree of blisters. One evaluated in the occurrence degree of blisters as a rating lower than 3 is worthless as a product, and hence, regardless of the evaluation of the effect of reducing a fat or oil content, the evaluation of the occurrence degree of blisters was preferentially regarded as a comprehensive evaluation rating.

Evaluation results of Experiment 1 are shown in Table 1 below.

TABLE 1

| Test Group | Noodle Belt Preparation | Number of Times of Rolling (Times) | Compression Ratio (%) | Fat/Oil Content (%) | Fat/Oil Reduction | Blisters | Comprehensive Evaluation |
|---|---|---|---|---|---|---|---|
| Example 1-1 | Extrusion −400 mmHg | 1 | 6.3 | 13 | 5 | 5 | 5 |
| Example 1-2 | Extrusion −400 mmHg | 1 | 3 | 12 | 5 | 5 | 5 |
| Example 1-3 | Extrusion −400 mmHg | 1 | 9.4 | 13.5 | 5 | 5 | 5 |
| Example 1-4 | Extrusion −400 mmHg | 2 | 7.5 | 13.9 | 5 | 5 | 5 |
| Example 1-5 | Extrusion −400 mmHg | 2 | 9.2 | 14.5 | 5 | 4.5 | 4.5 |
| Example 1-6 | Extrusion −400 mmHg | 2 | Second Rolling 6.4 | 15.2 | 4 | 4.5 | 4.3 |
| Example 1-7 | Extrusion −400 mmHg | 3 | 9.2 | 15.5 | 4 | 4 | 4 |
| Comparative Example 1-1 | Usual Compounding Normal Pressure | 6 | 58 | 19 | Reference | Reference | Reference |
| Comparative Example 1-2 | Extrusion −400 mmHg | 6 | 58 | 17 | 3 | 2 | 2 |
| Comparative Example 1-3 | Extrusion −700 mmHg | 6 | 58 | 15 | 4 | 1 | 1 |
| Comparative Example 1-4 | Extrusion −400 mmHg | 2 | 25 | 16.1 | 3 | 4 | 3.5 |
| Comparative Example 1-5 | Extrusion −400 mmHg | 2 | 50 | 16.5 | 3 | 3.5 | 3.3 |
| Comparative Example 1-6 | Extrusion −400 mmHg | 3 | 25 | 16.4 | 3 | 3 | 3 |
| Comparative Example 1-7 | Extrusion −400 mmHg | 4 | 9.2 | 17 | 3 | 3 | 3 |

As compared with the usual instant fried noodles of Comparative Example 1-1, when the extrusion was performed under reduced pressure as in Comparative Example 1-2 or Comparative Example 1-3, the effect of reducing a fat or oil content was seen in part, but a large number of blisters occurred, and hence, not only the appearance was poor but also the texture of a portion having a blister was weak when eaten, and surface smoothness was poor.

On the contrary, when the number of times of performing the rolling was three times or less and the strong rolling with a compression ratio less than 10% was performed as in Examples 1-1 to 1-7, not only the fat or oil content was reduced but also the occurrence of blisters was reduced. In particular, with respect to the effect of reducing a fat or oil content, the fat or oil content was reduced as the number of times of performing the rolling was smaller, and the compression ratio of the strong rolling was lower.

With respect to the compression ratio, when the compression ratio was 10% or more as in Examples 1-4 to 1-6 and Comparative Examples 1-4 to 1-5, even if the number of times of performing the rolling was three times or less, there was a tendency that the effect of reducing a fat or oil content was comparatively weak as compared with that of a test group in which the strong rolling with a compression ratio less than 10% was performed, and that a larger number of blisters occurred. Besides, with respect to the strong rolling, the fat or oil content was reduced when the strong rolling was performed in the first rolling as in Examples 1-4 to 1-6 than when the strong rolling was performed in the second rolling.

With respect to the number of times of performing the rolling, even when the strong rolling with a compression ratio less than 10% was performed as in Comparative Example 1-6, the effect of reducing a fat or oil content was weak if the number of times of performing the rolling was four times.

Experiment 2

<Examination on Condition of Reduced Pressure>

Example 2-1

A sample of fried noodles was produced in the same manner as in Example 1-5 except that the degree of vacuum employed in the preparation of a noodle belt was set to −700 mmHg.

Example 2-2

A sample of fried noodles was produced in the same manner as in Example 1-5 except that the degree of vacuum employed in the preparation of a noodle belt was set to −600 mmHg.

Example 2-3

A sample of fried noodles was produced in the same manner as in Example 1-5 except that the degree of vacuum employed in the preparation of a noodle belt was set to −200 mmHg.

Example 2-4

A sample of fried noodles was produced in the same manner as in Example 1-5 except that a noodle belt was prepared by extrusion performed under normal pressure (a degree of vacuum of 0 mmHg).

Evaluation results of Experiment 2 are shown in Table 2 below. The evaluation was performed in the same manner as in Experiment 1.

TABLE 2

| Test Group | Noodle Belt Preparation | Number of Times of Rolling (Times) | Compression Ratio (%) | Fat/Oil Content (%) | Fat/Oil Reduction | Blisters | Comprehensive Evaluation |
|---|---|---|---|---|---|---|---|
| Example 2-1 | Extrusion −700 mmHg | 2 | 9.2 | 12.7 | 5 | 3 | 4 |
| Example 2-2 | Extrusion −600 mmHg | 2 | 9.2 | 13 | 5 | 4 | 4.5 |
| Example 1-5 | Extrusion −400 mmHg | 2 | 9.2 | 14.5 | 5 | 5 | 5 |
| Example 2-3 | Extrusion −200 mmHg | 2 | 9.2 | 15.7 | 4 | 5 | 4.5 |
| Example 2-4 | Extrusion Normal Pressure | 2 | 9.2 | 16.3 | 3 | 5 | 4 |
| Comparative Example 1-1 | Usual Compounding Normal Pressure | 6 | 58 | 19 | Reference | Reference | Reference |

As a result of making examination on the conditions for the extrusion, as the pressure was reduced (as a value of a degree of vacuum (mmHg) was lower), the effect of reducing a fat or oil content was higher, and as the condition of the reduced pressure became closer to normal pressure, the number of blisters was reduced. As a preferable condition of the extrusion, from the viewpoint of the reduction of a fat or oil content, the degree of vacuum is preferably −200 mmHg or less, and taking blisters in consideration, it is preferably −700 mmHg or more. The degree of vacuum is more preferably −600 mmHg to −200 mmHg, and further in consideration of the effect of reducing a fat or oil content, it is understood that the degree of vacuum is preferably −600 to −400 mmHg.

Experiment 3

<Amount of Water Added>

Example 3-1

A sample of fried noodles was produced in the same manner as in Example 1-5 except that the amount of water added was 280 ml. At this point, the dough had a moisture of 32.8%.

Example 3-2

A sample of fried noodles was produced in the same manner as in Example 1-5 except that the amount of water added was 300 ml. At this point, the dough had a moisture of 33.8%.

Example 3-3

A sample of fried noodles was produced in the same manner as in Example 1-5 except that the amount of water added was 320 ml. At this point, the dough had a moisture of 34.8%.

Evaluation results of Experiment 3 are shown in Table 3 below. The evaluation was performed in the same manner as in Experiment 1.

TABLE 3

| Test Group | Amount of Water Added (Moisture) | Noodle Belt Preparation | Number of Times of Rolling (Times) | Compression Ratio (%) | Fat/Oil Content (%) | Fat/Oil Reduction | Blisters | Comprehensive Evaluation |
| --- | --- | --- | --- | --- | --- | --- | --- | --- |
| Example 3-1 | 280 ml 32.80% | Extrusion −400 mmHg | 2 | 9.2 | 13.1 | 5 | 5 | 5 |
| Example 3-2 | 300 ml 33.80% | Extrusion −400 mmHg | 2 | 9.2 | 13.6 | 5 | 5 | 5 |
| Example 3-3 | 320 ml 34.80% | Extrusion −400 mmHg | 2 | 9.2 | 14 | 5 | 5 | 5 |
| Example 1-5 | 340 ml 35.80% | Extrusion −400 mmHg | 2 | 9.2 | 14.5 | 5 | 4.5 | 4.5 |

As the amount of water added was smaller, the fat or oil content was reduced. Besides, the occurrence of blisters was improved although slightly. With respect to the texture, however, as the amount of water added was smaller, there was a tendency that well-cooked feeling was slightly degraded probably because the gelatinization was difficult to proceed. It was suggested that the amount of water added is preferably 32 to 36% by weight, and more preferably 33 to 35% by weight.

The invention claimed is:

1. A method for producing instant fried noodles, comprising:
    kneading a main raw material powder with kneading water added thereto so as to form dough;
    extruding the dough using an extruder so as to form a noodle belt;
    rolling out the noodle belt to have a determined thickness by performing a rolling operation once or twice using a single rolling roll or a plurality of rolling rolls;
    cutting, with a cutting blade roll, the rolled out noodle belt having the determined thickness so as to form raw noodle strings;
    gelatinizing the raw noodle strings; and
    drying the gelatinized noodle strings by frying so as to obtain the instant fried noodles;
    wherein the main raw material powder comprises wheat flour and at least one material other than wheat flour, wherein an amount of the wheat flour is larger than an amount of the at least one material other than wheat flour,
    wherein the kneading is performed for a duration that provides the instant fried noodles with a fat or oil content in a range from 12% to 15.7% by weight according to the Soxhlet extraction method,
    the rolling operation in the rolling out is performed so that a thickness of the noodle belt, after passing once through the single rolling roll or one of the plurality of rolling rolls, is less than 10% of a thickness of the noodle belt before the rolling out, and
    the extruding is performed under reduced pressure, the reduced pressure being in a range from 160 mmHg to 560 mmHg.

2. The method for producing instant fried noodles according to claim 1, wherein the rolling operation in the rolling out is performed once.

3. The method for producing instant fried noodles according to claim 1, wherein the thickness of the noodle belt after passing once through the single rolling roll or one of the plurality of rolling rolls is in a range from 3% to 8% of the thickness of the noodle belt before the rolling out.

4. The method for producing instant fried noodles according to claim 1, wherein a water content of the noodle strings after the drying by frying is in a range from 1% to 8% by weight.

5. The method for producing instant fried noodles according to claim 1, wherein the thickness of the noodle belt after passing once through the single rolling roll or one of the plurality of rolling rolls is 9.4% or less of the thickness of the noodle belt before the rolling out.

6. The method for producing instant fried noodles according to claim 1, wherein the thickness of the noodle belt after passing once through the single rolling roll or one of the plurality of rolling rolls is 9.2% or less of the thickness of the noodle belt before the rolling out.

* * * * *